US011689056B2

(12) United States Patent
Bhat et al.

(10) Patent No.: US 11,689,056 B2
(45) Date of Patent: Jun. 27, 2023

(54) TRANSMITTING ASSEMBLY FOR A UNIVERSAL WIRELESS CHARGING DEVICE AND A METHOD THEREOF

(71) Applicant: General Electric Company, Schenectady, NY (US)

(72) Inventors: Suma Memana Narayana Bhat, Karnataka (IN); Viswanathan Kanakasabai, Karnataka (IN); Arun Kumar Raghunathan, Karnataka (IN); Rahul Bhujade, Karnataka (IN); Satishbabu Bhogineni, Tn (IN); Somakumar Ramachandrapanicker, Karnataka (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/616,409

(22) PCT Filed: May 21, 2018

(86) PCT No.: PCT/US2018/033652
§ 371 (c)(1),
(2) Date: Nov. 22, 2019

(87) PCT Pub. No.: WO2018/222429
PCT Pub. Date: Dec. 6, 2018

(65) Prior Publication Data
US 2020/0176990 A1 Jun. 4, 2020

(30) Foreign Application Priority Data
May 30, 2017 (IN) .............................. 201741019042

(51) Int. Cl.
*H02J 50/12* (2016.01)
*H02J 50/40* (2016.01)
(Continued)

(52) U.S. Cl.
CPC ................ *H02J 50/12* (2016.02); *H02J 3/34* (2013.01); *H02J 5/00* (2013.01); *H02J 50/40* (2016.02); *H02J 50/70* (2016.02); *H02J 50/90* (2016.02)

(58) Field of Classification Search
CPC .... H02J 3/34; H02J 50/90; H02J 50/12; H02J 50/40; H02J 50/70; H02J 5/00; H02J 5/005; H02J 50/80; H02J 50/10
See application file for complete search history.

(56) References Cited

U.S. PATENT DOCUMENTS

2013/0236337 A1\* 9/2013 Gummin ............... F04B 43/043
310/15
2014/0361739 A1\* 12/2014 Kwak ..................... H02J 50/90
320/108

(Continued)

FOREIGN PATENT DOCUMENTS

WO     2017007932 A1    1/2017
WO     2018222429       12/2018

OTHER PUBLICATIONS

International Search Report issued for PCT/US2018/033652 dated Nov. 15, 2018.

(Continued)

*Primary Examiner* — Lincoln D Donovan
*Assistant Examiner* — Alex W Lam
(74) *Attorney, Agent, or Firm* — DeLizio, Peacock, Lewin & Guerra; John Guerra

(57) ABSTRACT

A transmitting assembly (114, 214, 334) configured to transmit electric power in a universal wireless charging device (102, 200, 302) is presented. The transmitting assembly (114, 214, 334) includes a first coil (116, 216, 316) embedded in a printed circuit board (220) and configured to transmit a first AC voltage signal having a first frequency. Also, the transmitting assembly (114, 214, 334) includes a second coil (118, 218, 318) disposed on the printed circuit board (220) and configured to transmit a second AC voltage signal having a second frequency, wherein the second frequency is different from the first frequency, and wherein the first AC voltage signal having the first frequency and the (Continued)

second AC voltage signal having the second frequency are used to wirelessly charge a plurality of receiver devices (104, 106) having different frequency standards.

19 Claims, 5 Drawing Sheets

(51) Int. Cl.
    *H02J 50/70*     (2016.01)
    *H02J 3/34*     (2006.01)
    *H02J 5/00*     (2016.01)
    *H02J 50/90*     (2016.01)

(56) References Cited

U.S. PATENT DOCUMENTS

| | | |
|---|---|---|
| 2015/0115723 A1 | 4/2015 | Levo et al. |
| 2015/0177330 A1 | 6/2015 | Morris et al. |
| 2015/0280450 A1* | 10/2015 | Park .................. H02J 50/005 307/104 |
| 2015/0318735 A1* | 11/2015 | Jeong .................. H02J 50/12 320/108 |
| 2015/0357827 A1 | 12/2015 | Muratov et al. |
| 2016/0056664 A1* | 2/2016 | Partovi ................ B60L 53/122 307/104 |
| 2016/0241087 A1 | 8/2016 | Bae |
| 2016/0372961 A1* | 12/2016 | Ritter .................. H02J 7/00304 |
| 2017/0040105 A1* | 2/2017 | Peralta .................. H01F 38/14 |

OTHER PUBLICATIONS

Office Action issued in connection with corresponding Indian patent application No. 201741019042 dated Dec. 24, 2019.
"PCT Application No. PCT/US2018/033652 International Preliminary Report on Patentability", dated Dec. 12, 2019, 9 pages.
"PCT Application No. PCT/US2018/033652 Written Opinion", dated Nov. 15, 2018, 7 pages.
"India Application No. 201741019042 Extended Hearing Notice", Jun. 28, 2022, 2 pages.

\* cited by examiner

TRANSMITTING ASSEMBLY FOR A UNIVERSAL WIRELESS CHARGING DEVICE AND A METHOD THEREOF

BACKGROUND

Embodiments of the present specification relate generally to wireless power transfer systems, and more particularly to a transmitting assembly of a universal wireless charging device in the wireless power transfer systems.

In general, power transfer systems are widely used to transfer power from a power source to one or more receiver devices, such as mobile devices, biomedical devices, and portable consumer devices. Typically, the power transfer systems are contact based power transfer systems or wireless power transfer systems. In certain applications, where instantaneous or continuous power transfer is required but interconnecting wires are inconvenient, the wireless power transfer systems are desirable.

In the wireless power transfer systems, a charging device is used to convert an input power to a transferrable power which is then wirelessly transmitted to charge one or more batteries in the receiver devices. However, each receiver device is compatible with one wireless frequency standard. Currently available frequency standards include a Wireless Power Consortium (WPC) with Qi standard and an Air Fuel Alliance (AFA) standard. The Qi standard is defined in a frequency range from 100 kHz to 400 kHz, while the AFA standard is defined in a frequency range from 6 MHz to 8 MHz. Further, design of any new wireless receiver devices will entail use of one of these two frequency standards.

A conventional charging device transmits the input power at only one frequency standard. Hence, for each frequency standard separate charging devices are employed to transmit the electric power to the corresponding receiver device. However, using separate charging devices for each frequency standard substantially increases set-up costs and maintenance costs of the wireless power transfer systems.

BRIEF DESCRIPTION

Briefly in accordance with one aspect of the present specification, a transmitting assembly configured to transmit electric power in a universal wireless charging device is presented. The transmitting assembly includes a first coil embedded in a printed circuit board and configured to transmit a first AC voltage signal having a first frequency. Also, the transmitting assembly includes a second coil disposed on the printed circuit board and configured to transmit a second AC voltage signal having a second frequency, wherein the second frequency is different from the first frequency, and wherein the first AC voltage signal having the first frequency and the second AC voltage signal having the second frequency are used to wirelessly charge a plurality of receiver devices having different frequency standards.

In accordance with another aspect of the present specification, a method for transmitting electric power from a transmitting assembly in a universal wireless charging device is presented. The method includes transmitting, by a first coil of the transmitting assembly, a first AC voltage signal having a first frequency, wherein the first coil is embedded in a printed circuit board (PCB). Also, the method includes transmitting, by a second coil of the transmitting assembly, a second AC voltage signal having a second frequency, wherein the second frequency is different from the first frequency, and wherein the first AC voltage signal having the first frequency and the second AC voltage signal having the second frequency are used to wirelessly charge a plurality of receiver devices having different frequency standards.

In accordance with yet another aspect of the present specification, a universal wireless charging device is presented. The universal wireless charging device includes a power source configured to generate a direct current (DC) voltage signal. Also, the universal wireless charging device includes a driver unit coupled to the power source and configured to convert the DC voltage signal to one of a first AC voltage signal having a first frequency and a second AC voltage signal having a second frequency, wherein the second frequency is different from the first frequency. Further, the universal wireless charging device includes a transmitting assembly coupled to the driver unit and including a first coil embedded in a printed circuit board (PCB) and configured to transmit the first AC voltage signal having the first frequency, and a second coil disposed on the printed circuit board and configured to transmit the second AC voltage signal having the second frequency, and wherein the first AC voltage signal having the first frequency and the second AC voltage signal having the second frequency are used to wirelessly charge a plurality of receiver devices having different frequency standards.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

As will be described in detail hereinafter, various embodiments of a system and method for charging one or more wireless receiver devices are disclosed. In particular, the system and method disclosed herein employ a transmitting assembly that is configured to transmit electric power at one or more frequency standards to the wireless receiver devices. More specifically, the transmitting assembly includes a coil structure that aids in transmitting the electric power at different frequency standards.

Figure 1:
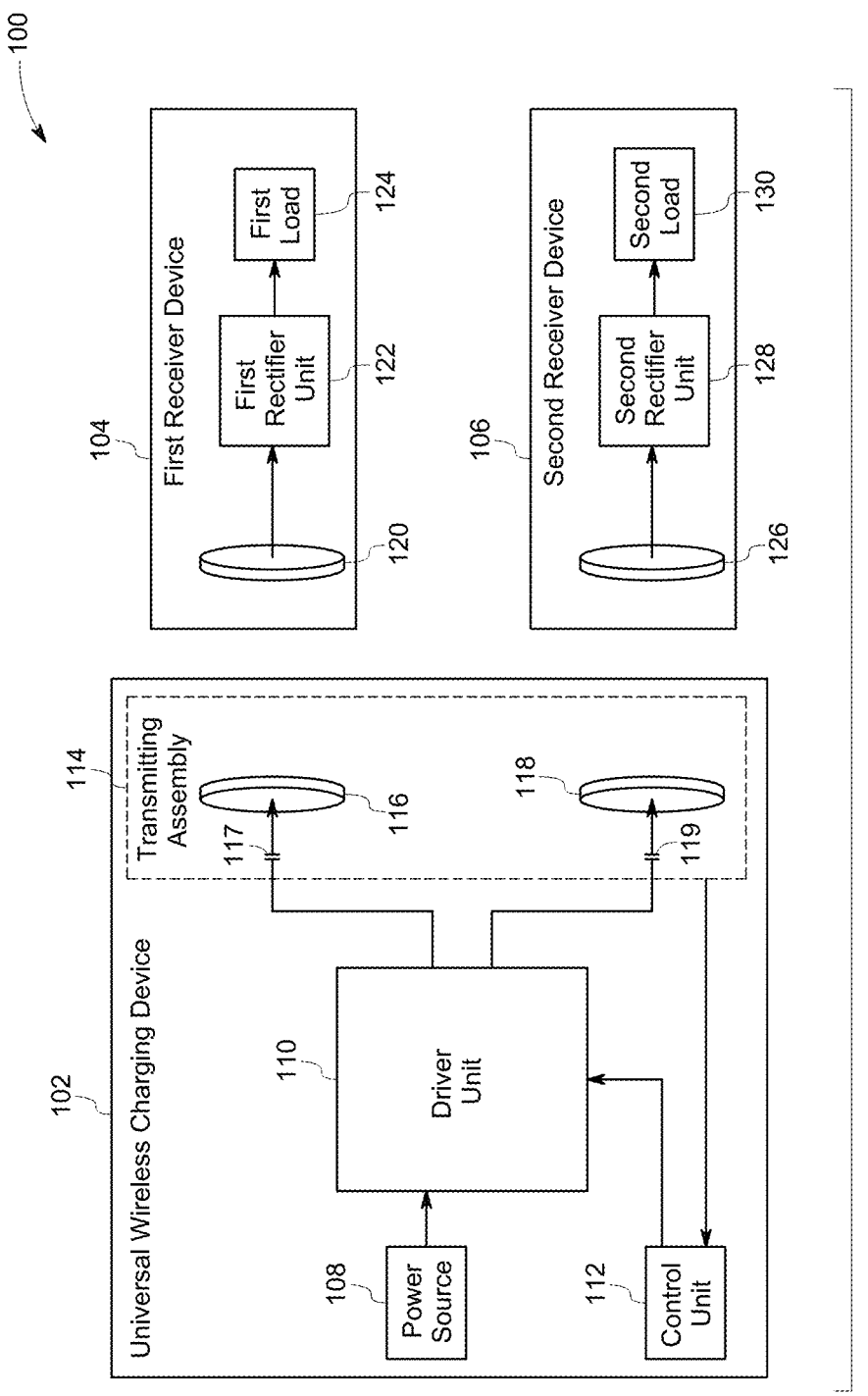
FIG. 1 is a block diagram of a wireless power transfer system, in accordance with aspects of the present specification.

FIG. 1 is a block diagram of a wireless power transfer system 100, in accordance with aspects of the present specification. The wireless power transfer system 100 is used to transmit electric power to one or more receiver devices such as mobile devices, biomedical devices, portable consumer devices, and the like. For example, in an automobile industry, a vehicle includes one or more charging pads that are used to wirelessly transmit the electric power to mobile devices to charge batteries in the mobile devices. The mobile devices may be cell phones, laptops, and the like.

In the illustrated embodiment, the wireless power transfer system 100 includes a universal wireless charging device 102 that is wirelessly coupled to a first receiver device 104 and a second receiver device 106. It may be noted that the terms "universal wireless charging device," "wireless charging device," and "charging pad" may be used interchangeably in the following description.

Further, the first and second receiver devices 104, 106 may be compatible with one of the wireless frequency standards. For example, one of the receiver devices may be compatible with the Air Fuel Alliance (AFA) standard that is defined in a frequency range from 6 MHz to 8 MHz. Similarly, another receiver device may be compatible with the Wireless Power Consortium (WPC) with Qi standard that is defined in a frequency range from 100 kHz to 400 kHz. For ease of explanation, the first receiver device 104 is considered to be compatible with a first frequency standard, such as the AFA standard. Similarly, the second receiver device 106 is considered to be compatible with a second frequency standard, such as the Qi standard. Although the first and second receiver devices 104, 106 are described as adhering to one of the two currently available frequency standards, it may be noted that the receiver devices 104, 106 may adhere to other frequency standards and are not limited to the frequency standards mentioned herein. Moreover, although the presently contemplated configuration of FIG. 1 depicts the system 100 as including two receiver devices 104, 106, use of any number of receiver devices that are compatible with one or more frequency standards is envisioned.

As previously noted, in conventional power transfer systems, a charging device is operated at only one frequency standard to transmit electric power to the receiver devices. Hence, separate charging devices having a dedicated converter and a dedicated coil for each frequency standard are employed to transmit the electric power to the corresponding receiver device. However, using separate charging devices for each frequency standard substantially increases costs associated with the set-up and maintenance of the conventional power transfer systems. Also, using separate charging devices to charge the receiver devices having different frequency standards is inconvenient for a user.

To overcome the above drawbacks associated with the conventional power transfer systems, the power transfer system 100 includes the exemplary wireless charging device 102. This wireless charging device 102 is configured to charge both the first and second receiver devices 104, 106 having different frequency standards, thereby circumventing the need for separate charging devices for charging receiver devices that adhere to different frequent standards. In particular, the wireless charging device 102 includes a coil structure that aids in charging the receiver devices 104, 106 having different frequency standards. The wireless charging device 102 may be referred to as a charging pad or an electrical enclosure upon which the receiver devices 104, 106 are positioned for charging one or more batteries in the corresponding receiver devices 104, 106.

Further, the wireless charging device 102 includes a power source 108, a driver unit 110, a control unit 112, and a transmitting assembly 114. The driver unit 110 is electrically coupled to the power source 108, the control unit 112, and the transmitting assembly 114. The power source 108 is configured to supply an input power having a DC voltage to the driver unit 110. In one example, the input power may be in a range from about 1 W to about 200 W. In one embodiment, the power source 108 may be a part of the wireless charging device 102. In another embodiment, the power source 108 may be positioned external to the wireless charging device 102. It may be noted that the input power having the DC voltage supplied by the power source 108 may be referred as a "DC voltage signal" in the following description.

Also, the control unit 112 is configured to generate a first control signal and a second control signal at regular time intervals. In one embodiment, the control unit 112 may generate the first and second control signals based on user input data or data that is pre-stored in the control unit 112. In another embodiment, the control unit 112 may generate the first and second control signals based on any change in characteristics of the transmitting assembly 114. In one example, the characteristics of the transmitting assembly 114 include impedance, electric current, and voltage in the transmitting assembly 114. More specifically, if the first receiver device 104 or the second receiver device 106 is proximate to the wireless charging device 102, the characteristics of the transmitting assembly 114 may change. Also, any change in the characteristics of the transmitting assembly 114 due to the first receiver device 104 is different from a change in the characteristics of the transmitting assembly 114 due to the second receiver device 106. Further, the control unit 112 may monitor the change in the characteristics of the transmitting assembly 114 to identify the source of the change in the characteristics of the transmitting assembly 114. By way of example, the control unit 112 may identify the first receiver device 104 or the second receiver device 106 as the source of the change in the characteristics of the transmitting assembly 114. If the first receiver device 104 is identified by the control unit 112, the control unit 112 generates the first control signal to operate the driver unit 110 at the first frequency. Similarly, if the second receiver device 106 is identified, the control unit 112 generates the second control signal to operate the driver unit 110 at the second frequency.

Also, the control unit 112 is configured to communicate the first control signal or the second control signal to the driver unit 110. More specifically, if the first receiver device 104 is proximate to the wireless charging device 102, the control unit 112 communicates the first control signal to the driver unit 110 to operate the driver unit 110 at the first frequency. The driver unit 110 is operated at the first frequency to transmit electric power at the first frequency to the first receiver device 104. Similarly, if the second receiver device 106 is proximate to the wireless charging device 102, the control unit 112 communicates the second control signal to the driver unit 110 to operate the driver unit 110 at the second frequency. The driver unit 110 is operated at the second frequency to transmit electric power at the second frequency to the second receiver device 106.

In certain embodiments, if both the receiver devices 104, 106 are proximate to the wireless charging device 102, the control unit 112 may identify the presence of both the receiver devices 104, 106. In this embodiment, the control unit 112 may alternately and repeatedly communicate the first control signal and the second control signal to the driver unit 110 to alternately operate the driver unit 110 at the first frequency and the second frequency to transmit electric power to both the receiver devices 104, 106. For ease of understanding, the embodiment of detecting/identifying the presence of one of the receiver devices 104, 106 and communicating a corresponding control signal to the driver unit 110 is considered in the following description.

Further, the driver unit 110 is configured to receive the DC voltage signal from the power source 108. Additionally, the driver unit 110 is configured to receive the first control signal or the second control signal from the control unit 112. The driver unit 110 is configured to transform the DC voltage signal based on receipt of the first control signal or the second control signal. By way of example, if the first control signal is received from the control unit 112, the driver unit 110 is configured to convert the DC voltage signal to a first AC voltage signal having a first frequency. It may be noted that the first frequency may be one of the frequencies corresponding to a frequency band associated with the first frequency standard. In one example, the first frequency may be about 6.8 MHz. In a similar manner, if the second control signal is received from the control unit 112, the driver unit 110 is configured to convert the DC voltage signal to a second AC voltage signal having a second frequency. It may be noted that the second frequency may be one of the frequencies corresponding to a frequency band associated with the second frequency standard. In one example, the second frequency may be about 200 kHz. Furthermore, in one example, magnitudes of the first and second AC voltage signals may be in a range from about 5 Volts to about 50 Volts. It may be noted that the first AC voltage signal may be referred to as a "high frequency signal" and the second AC voltage signal may be referred to as a "low frequency signal."

In one embodiment, the driver unit 110 may include a bridge circuit to convert the DC voltage signal to the first AC voltage signal or the second AC voltage signal. Further, the driver unit 110 is configured to transmit the first AC voltage signal or the second AC voltage signal to the transmitting assembly 114.

As noted hereinabove, the transmitting assembly 114 is configured to wirelessly transmit the first AC voltage signal or the second AC voltage signal to the receiver devices 104, 106. It may be noted that the electric power for charging the receiver devices 104, 106 is transmitted in the form of the first AC voltage signal or the second AC voltage signal to the receiver devices 104, 106. In one embodiment, the transmitting assembly 114 includes a coil structure and one or more capacitors that are configured to transmit the first AC voltage signal or the second AC voltage signal to the receiver devices 104, 106. In the embodiment of FIG. 1, the coil structure in the transmitting assembly 114 includes a first coil 116 and a second coil 118, while the one or more capacitors include a first capacitor 117 and a second capacitor 119. Further, the first coil 116 and the first capacitor 117 are coupled to the driver unit 110. In one example, the first capacitor 117 is coupled in series with the first coil 116. Similarly, the second coil 118 and the second capacitor 119 are coupled to the driver unit 110. In one example, the second capacitor 119 is coupled in series with the second coil 118. It may be noted that the transmitting assembly 114 may include a plurality of first coils and a plurality of second coils, and is not limited to one first coil 116 and one second coil 118.

Figure 2:
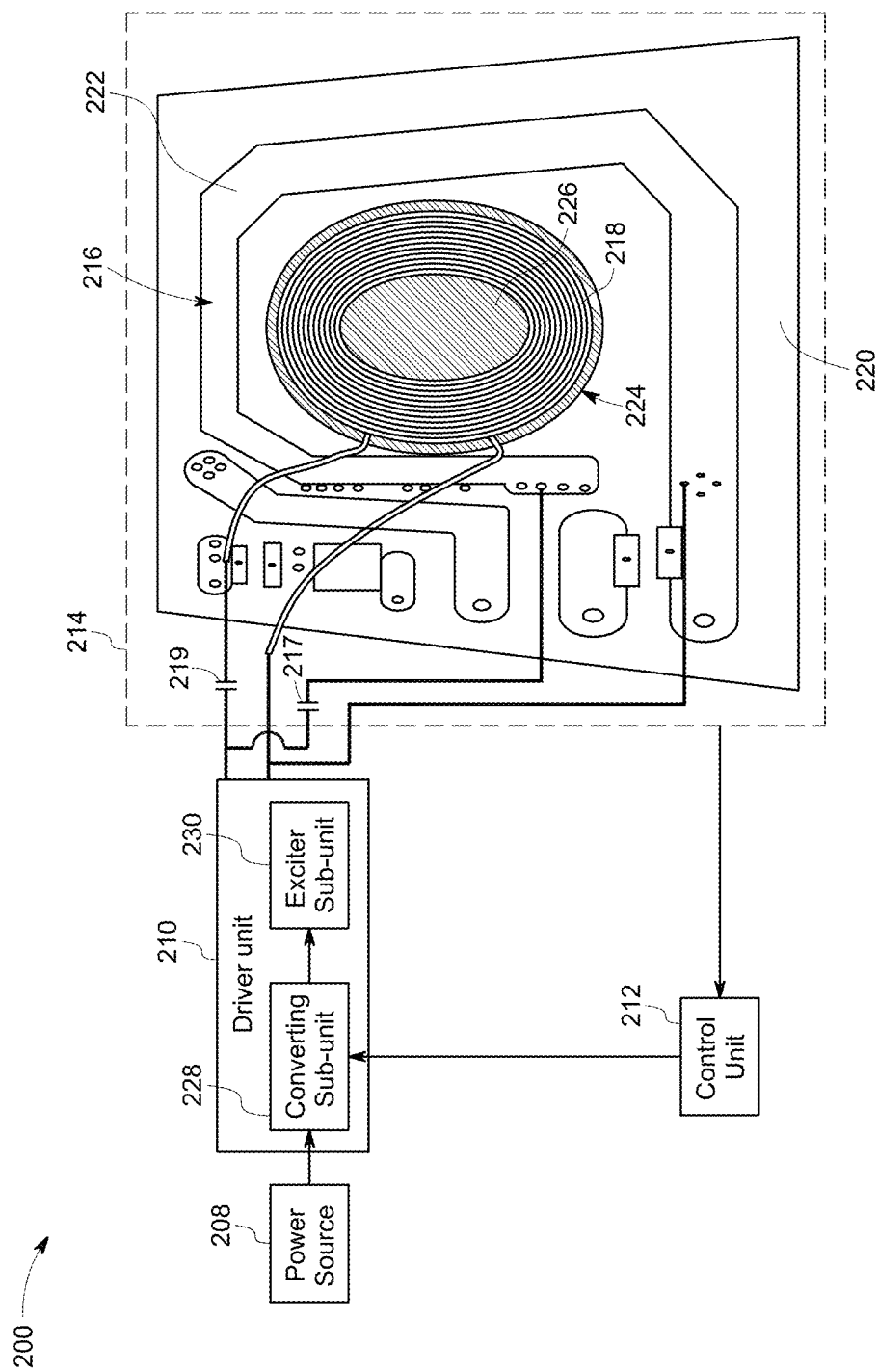
FIG. 2 is a diagrammatical representation of a universal wireless charging device for transmitting electric power for use in the system of FIG. 1, in accordance with aspects of the present specification.

In accordance with aspects of the present specification, the first coil 116 is embedded in a printed circuit board (PCB) (see FIG. 2). Also, the first coil 116 is configured to transmit the first AC voltage signal having the first frequency. In one embodiment, the first coil 116 may be embedded in the PCB or printed on the PCB in the form of one or more electrical conducting tracks. Moreover, the first coil 116 along with the first capacitor 117 is designed to offer a low impedance to the first AC voltage signal having the first frequency and a high impedance to the second AC voltage signal having the second frequency.

Additionally, the second coil 118 is disposed on the PCB. In some other embodiments, the second coil 118 may be disposed within an aperture of the PCB. The second coil 118 is configured to transmit the second AC voltage signal having the second frequency. In one embodiment, the second coil 118 is a Litz wire coil that is wound in a desired shape. Some examples of the desired shape include, but are not limited to, a circular shape, an elliptical shape, a figure of eight shape, and the like. Moreover, the second coil 118 along with the second capacitor 119 is designed to offer a low impedance to the second AC voltage signal having the second frequency and a high impedance to the first AC voltage signal having the first frequency.

Furthermore, in one embodiment, the first coil 116 and the second coil 118 are concentric and coplanar to each other. In one example, the first coil 116 may be printed and/or embedded along/around a periphery of the PCB and the second coil 118 is positioned such that the first coil 116 surrounds the second coil 118. Also, in another embodiment, the first coil 116 and the second coil 118 are adjacent to each other or positioned side-by-side on the same plane. The structure of the first and second coils 116, 118 will be described in greater detail with reference to FIGS. 2 and 3.

In addition to the first coil 116 and the second coil 118, the transmitting assembly 114 includes a shielding unit (not shown) configured to shield one or more components in the wireless charging device 102 from an AC magnetic field associated with at least one of the first AC voltage signal and the second AC voltage signal. In one example, the components include the power source 108, the driver unit, 110, and the control unit 112. As will be appreciated, the AC magnetic field may be generated when the first AC voltage signal and/or the second AC voltage signal respectively flow through the first coil 116 and the second coil 118. In one embodiment, the shielding unit may be coupled to the first coil 116 or the second coil 118. In another embodiment, the shielding unit may be shared by the first and second coils 116, 118. The aspect of shielding the components will be described in greater detail with reference to FIG. 3.

As depicted in FIG. 1, the first receiver device 104 includes a first receiver coil 120, a first rectifier unit 122, and a first load 124. Similarly, the second receiver device 106 includes a second receiver coil 126, a second rectifier unit 128, and a second load 130. Also, as previously noted, the first and second receiver devices 104, 106 are configured to receive electric power in the form of the first AC voltage signal or the second AC voltage signal to charge the respective load 124, 130, such as batteries in the first and second receiver devices 104, 106. In one embodiment, the loads 124, 130 may be passive loads like resistive loads or other kinds of active loads.

Further, in one embodiment, the first coil 116 in the transmitting assembly 114 may be wirelessly coupled to the first receiver coil 120 in the first receiver device 104. Moreover, if the driver unit 110 generates the first AC voltage signal having the first frequency, the first coil 116 is excited to transmit the first AC voltage signal having the first frequency to the first receiver coil 120 in the first receiver device 104. Also, the first rectifier unit 122 in the first receiver device 104 is configured to receive the first AC voltage signal from the first receiver coil 120 and convert the first AC voltage signal to a first DC voltage signal. The first DC voltage signal is used to charge the first load 124, such as a battery in the first receiver device 104.

Similarly, the second coil 118 in the transmitting assembly 114 is wirelessly coupled to the second receiver coil 126 in the second receiver device 106. Moreover, if the driver unit 110 generates the second AC voltage signal having the second frequency, the second coil 118 is excited to transmit the second AC voltage signal having the second frequency to the second receiver coil 126 in the second receiver device 106. Also, the second rectifier unit 128 in the second receiver device 106 is configured to receive the second AC voltage signal from the second receiver coil 126 and convert the second AC voltage signal to a second DC voltage signal. Further, the second DC voltage signal is used to charge the second load 130, such as a battery in the second receiver device 106.

Implementing the wireless power transfer system 100 having the exemplary single wireless charging device 102 as described hereinabove allows wireless transmission/transfer of electric power to a plurality of receiver devices such as the first and second receiver devices 104, 106, where the receiver devices are compatible with one or more frequency standards. Accordingly, use of the single wireless charging device 102 facilitates charging of multiple receiver devices that conform to different frequency standards, thereby circumventing the shortcomings of the currently available charging devices.

Referring to FIG. 2, a diagrammatical representation of one embodiment of a universal wireless charging device 200 for transmitting electric power, in accordance with aspects of the present specification is depicted. The universal wireless charging device 200 is similar to the universal wireless charging device 102 of FIG. 1. The universal wireless charging device 200 includes a power source 208, a driver unit 210, a control unit 212, and a transmitting assembly 214. FIG. 2 is described with reference to the components of FIG. 1.

As depicted in FIG. 2, the transmitting assembly 214 includes a first coil 216, a first capacitor 217, a second coil 218, a second capacitor 219, and a printed circuit board (PCB) 220. In one example, the PCB 220 may have a thickness in a range from about 1 mm to about 3 mm. Also, the PCB 220 may have a width in a range from about 40 mm to about 100 mm and a length in a range from about 40 mm to about 100 mm.

Further, in accordance with aspects of the present specification, the first coil 216 is embedded in the PCB 220 and configured to transmit a first AC voltage signal having a first frequency. In the embodiment of FIG. 2, the first coil 216 is formed by embedding and/or printing one or more electrical conducting tracks 222 along a periphery of the PCB 220. Also, these electrical conducting tracks 222 may have a determined trace width and trace thickness that aid in minimizing a size of the first coil 216 to transmit the first AC voltage signal. In one example, the trace width of the first coil 216 may be in a range from about 1 mm to about 10 mm and the trace thickness of the first coil 216 may be in a range from about 35 microns and 210 microns.

Also, these electrical conducting tracks 222 along with the first capacitor 217 are configured to offer low impedance to a high frequency signal, such as the first AC voltage signal to allow electric power transfer from the transmitting assembly 214 to a receiver device using the first AC voltage signal. Also, the electrical conducting tracks 222 along with the first capacitor 217 are configured to offer a very high impedance to a low frequency signal, such as the second AC voltage signal to block electric power transfer from the transmitting assembly 214 to a receiver device using the second AC voltage signal. Hence, the first coil 216 transmits only the first AC voltage signal having the first frequency to receiver devices, such as the receiver devices 104, 106.

In another embodiment, the first coil 216 may be embedded on a plurality of layers (not shown) in the PCB 220. More specifically, the electrical conducting tracks 222 may be printed on the plurality of layers in the PCB 220. In one embodiment, the first coil 216 may be helically disposed across multiple layers in the PCB 220. In another embodiment, the first coil 216 may be spirally disposed across one or more layers in the PCB 220. Further, the electrical conducting tracks 222 in each of these layers may be coupled to each other to form a coil structure that is representative of the first coil 216. This coil structure is used for generating an AC magnetic field (see FIG. 3) that corresponds to the first AC voltage signal. Moreover, since the first coil 216 is printed on and/or embedded within the PCB 220, any variations in one or more parameters associated with the first coil 216 may be controlled to enhance the transmission of the first AC voltage signal, while minimizing/reducing power loss during the transmission of the first AC voltage signal. The parameters associated with the first coil 216 include a leakage inductance of the coil 216, a leakage capacitance of the coil 216, a resistance of the coil 216, and the like.

Furthermore, the second coil 218 is disposed on the PCB 220 or within an aperture 224 of the PCB 220 and configured to transmit the second AC voltage signal having the second frequency. In one embodiment, the second coil 218 is a Litz wire coil that is wound in a desired shape. As previously noted, some non-limiting examples of the desired shape include a circular shape, an elliptical shape, a figure of eight, shape, and the like. Also, a thickness of the Litz wire coil 218 may be in a range from about 0.2 mm to about 5 mm.

In the embodiment of FIG. 2, as noted hereinabove, the first coil 216 is embedded along the periphery of the PCB 220. Furthermore, in the example of FIG. 2, the aperture 224 is located at/about a central portion of the PCB 220 that is away from the periphery of the PCB 220. Accordingly, the first coil 216 that is printed on/embedded within the PCB 220 surrounds the aperture 224 in the PCB 220. Further, the second coil 218 in the form of the Litz wire coil is positioned within the aperture 224 of the PCB 220. Consequently, since the second coil 218 is positioned within the aperture 224 of the PCB 220, use of the real estate on the PCB 220 is optimized, thereby improving the compactness of the transmitting assembly 214.

Moreover, the second coil 218 along with the second capacitor 219 are configured to offer a low impedance to a low frequency signal, such as the second AC voltage signal to allow electric power transfer from the transmitting assembly 214 to a receiver device using the second AC voltage signal. In a similar fashion, the second coil 218 along with the second capacitor 219 are configured to offer a high impedance to a high frequency signal, such as the first AC voltage signal to block electric power transfer from the transmitting assembly 214 to a receiver device using the second AC voltage signal. Hence, the second coil 218 transmits only the second AC voltage signal having the second frequency to the receiver devices 104, 106. Also, since the second coil 218 transmits a low frequency signal, such as the second AC voltage signal, variations in the parameters associated with the second coil 218 have low impact on the power transfer capability at the low frequency. Moreover, as the Litz wire coil is used as the second coil 218, skin effect losses, eddy current losses, and proximity losses in the second coil 218 may be substantially reduced, which in turn improves efficiency of transmitting the second AC voltage signal.

In the embodiment of FIG. 2, the first coil 216 and the second coil 218 are coplanar and concentric to each other. In another embodiment, the first coil 216 and the second coil 218 may be positioned adjacent to each other or positioned side-by-side. Also, in yet another embodiment, the first coil 216 may be printed on or embedded in one PCB, while the second coil 218 may be disposed on another PCB.

The design of the transmitting assembly 214 presented hereinabove aids in reducing the size of the transmitting assembly 214. In particular, the first coil 216 having a desired shape is printed on or embedded along the periphery of the PCB 220 and the second coil 218 is wound in a desired shape and positioned at the center of the PCB 220. It may be noted that the first coil 216 and the second coil 218 may be arranged in any desired manner in the transmitting assembly 214, and is not limited to the structure depicted in FIG. 2.

In addition to the first coil 216 and the second coil 218, the transmitting assembly 214 includes a shielding unit 226. In one embodiment, the shielding unit 226 is positioned beneath the first coil 216 and the second coil 218. The shielding unit 226 is used to shield the components of the universal wireless charging device 200, such as the driver unit 210, the control unit 212, and the power source 208 from the AC magnetic field generated by the first and/or second coils 216, 218. The aspect of shielding the components is described in greater detail with reference to FIG. 3.

Further, in the embodiment of FIG. 2, the driver unit 110 includes a converting sub-unit 228 and an exciter sub-unit 230 that are electrically coupled to each other. The converting sub-unit 228 is configured to generate the first AC voltage signal having the first frequency and the second AC voltage signal having the second frequency. In one example, the converting sub-unit 228 includes a full-bridge circuit, a half-bridge circuit, or a combination thereof (not shown). Further, the converting sub-unit 228 is electrically coupled to the control unit 212 and the power source 208.

As previously noted with reference to FIG. 1, the control unit 212 is configured to generate a first control signal or a second control signal. Also, the driver unit 210 is configured to receive a DC voltage signal from the power source 208. Moreover, the driver unit 210 is configured to use the DC voltage signal and generate a first AC voltage signal or a second AC voltage signal in response to receipt of the first control signal or the second control signal from the control unit 212.

Accordingly, if the driver unit 210 receives the first control signal from the control unit 212, the converting sub-unit 228 is configured to convert the DC voltage signal to the first AC voltage signal having the first frequency. In a similar fashion, if the driver unit 210 receives the second control signal from the control unit 212, the converting sub-unit 228 is configured to convert the DC voltage signal to the second AC voltage signal having the second frequency. In one embodiment, the converting sub-unit 228 is a single converter that is electrically coupled to the power source 208 and configured to receive the DC voltage signal from the power source 208. The term single converter refers to an electrically coupled device that has a single DC input. Further, this single converter converts the DC voltage signal to the first AC voltage signal having the first frequency and/or the second AC voltage signal having the second frequency. In conventional charging devices, a dedicated converter for each frequency standard is employed to transmit the electric power to the corresponding receiver device. However, using separate converters for each frequency standard substantially increases costs associated with the set-up and maintenance of the conventional power transfer systems. In the exemplary wireless charging device 200, the single converter is used to transmit electric power to the receiver devices having same or different frequency standards.

In one embodiment, the exciter sub-unit 230 is employed to transmit/communicate the first AC voltage signal and/or the second AC voltage signal from the converting sub-unit 228 to the transmitting assembly 214. In particular, the exciter sub-unit 230 includes one or more exciter coils (not shown) that are electrically coupled to the converting sub-unit 228 and magnetically coupled to the transmitting assembly 214. It may be noted that the term "magnetically coupled" refers to a wireless coupling between the exciter coils in the exciter sub-unit 230 and a corresponding coil in the transmitting assembly 214 using an AC magnetic field between the coils. In this embodiment, the exciter coils in the exciter sub-unit 230 are magnetically coupled to the first and second coils 216, 218 in the transmitting assembly 214.

If the exciter coils in the exciter sub-unit 230 receive the first AC voltage signal having the first frequency from the converting sub-unit 228, the first coil 216 and a corresponding capacitor (not shown) in the transmitting assembly 214 resonate at the first frequency to generate an AC magnetic field that corresponds to the first AC voltage signal. Further, a receiver device such as the first receiver device 104 that is positioned proximate to the wireless charging device 200 receives this AC magnetic field. Also, since in the example of FIG. 1, the first receiver device 104 is designed to operate at the first frequency standard, the first receiver device 104 may convert the received AC magnetic field back to the first AC voltage signal, which is used for charging batteries in the first receiver device 104.

In a similar manner, if the exciter coils in the exciter sub-unit 230 receive the second AC voltage signal having the second frequency from the converting sub-unit 228, the second coil 218 and a corresponding capacitor (not shown) in the transmitting assembly 214 resonate at the second frequency to generate an AC magnetic field that corresponds to the second AC voltage signal. Further, a receiver device such as the second receiver device 106 that is positioned proximate to the wireless charging device 200 receives this AC magnetic field. Also, since in the example of FIG. 1, the second receiver device 106 is designed to operate at the second frequency standard, the second receiver device 106 may convert the received AC magnetic field back to the corresponding second AC voltage signal, which is used for charging batteries in the second receiver device 106.

In another embodiment, the converting sub-unit 228 may be directly coupled to the transmitting assembly 214. By way of example, the converting sub-unit 228 may be directly coupled to the transmitting assembly 214 via one or more electric cables. Accordingly, in this example, in the absence of the exciter sub-unit 230, the converting sub-unit 228 is configured to directly transmit the first AC voltage signal and the second AC voltage signal to the transmitting assembly 214. In particular, the first coil 216 in the transmitting assembly 214 may be electrically coupled to the converting sub-unit 228 and inductively coupled to the first receiver device 104. Further, if the first AC voltage signal having the first frequency is generated by the converting sub-unit 228, the first coil 216 is excited by the first AC voltage signal to transmit the first AC voltage signal having the first frequency to the first receiver device 104.

In a similar manner, the second coil 218 in the transmitting assembly 214 may be electrically coupled to the converting sub-unit 228 and inductively coupled to the second receiver device 106. Further, if the second AC voltage signal 116 having the second frequency is generated by the converting sub-unit 228, the second coil 218 is excited by the second AC voltage signal to transmit the second AC voltage signal having the second frequency to the second receiver device 106. For ease of explanation, the example where the converting sub-unit 228 is directly coupled to the transmitting assembly 214 is considered in the following description.

During operation of the universal wireless charging device 200, the control unit 212 may generate the first control signal and/or the second control signal. In one example, the control unit 212 may generate the first control signal and/or the second control signal based on user input data or any change in characteristics, such as electrical current, voltage, and impedance of the transmitting assembly 214. Further, the control unit 212 transmits the first control signal and/or the second control signal to the driver unit 210.

If the driver unit 210 receives the first control signal, the converting sub-unit 228 in the driver unit 210 converts the DC voltage signal to the first AC voltage signal having the first frequency. Further, the converting sub-unit 228 transmits the first AC voltage signal having the first frequency to the transmitting assembly 214. Subsequent to the receipt of the first AC voltage signal having the first frequency by the transmitting assembly 214, the first coil 216 and the first capacitor 217 in the transmitting assembly 214 may be excited at the first frequency to generate the AC magnetic field corresponding to the first AC voltage signal. Moreover, a receiver coil such as the first receiver coil 120 in the first receiver device 104 receives this AC magnetic field and converts this AC magnetic field back to the first AC voltage signal. Also, a rectifier unit such as the first rectifier unit 122 in the first receiver device 104 rectifies this first AC voltage signal to a first DC voltage signal. The first DC voltage signal is used for charging a load such as the first load 124 in the first receiver device 104.

Similarly, if the driver unit 210 receives the second control signal from the control unit 212, the converting sub-unit 228 in the driver unit 210 converts the DC voltage signal to the second AC voltage signal having the second frequency. Further, the converting sub-unit 228 transmits the second AC voltage signal having the second frequency to the transmitting assembly 214. Subsequent to the receipt of the second AC voltage signal having the second frequency by the transmitting assembly 214, the second coil 218 and the second capacitor 219 in the transmitting assembly 214 may be excited at the second frequency to generate the AC magnetic field corresponding to the second AC voltage signal having the second frequency. Moreover, a receiver coil such as the second receiver coil 126 in the second receiver device 106 receives this AC magnetic field and converts this AC magnetic field back to the second AC voltage signal. Also, a rectifier unit such as the second rectifier unit 128 in the second receiver device 106 rectifies this second AC voltage signal to a second DC voltage signal. Further, the second DC voltage signal is used for charging a load such as the second load 130 in the second receiver device 106.

Figure 3:
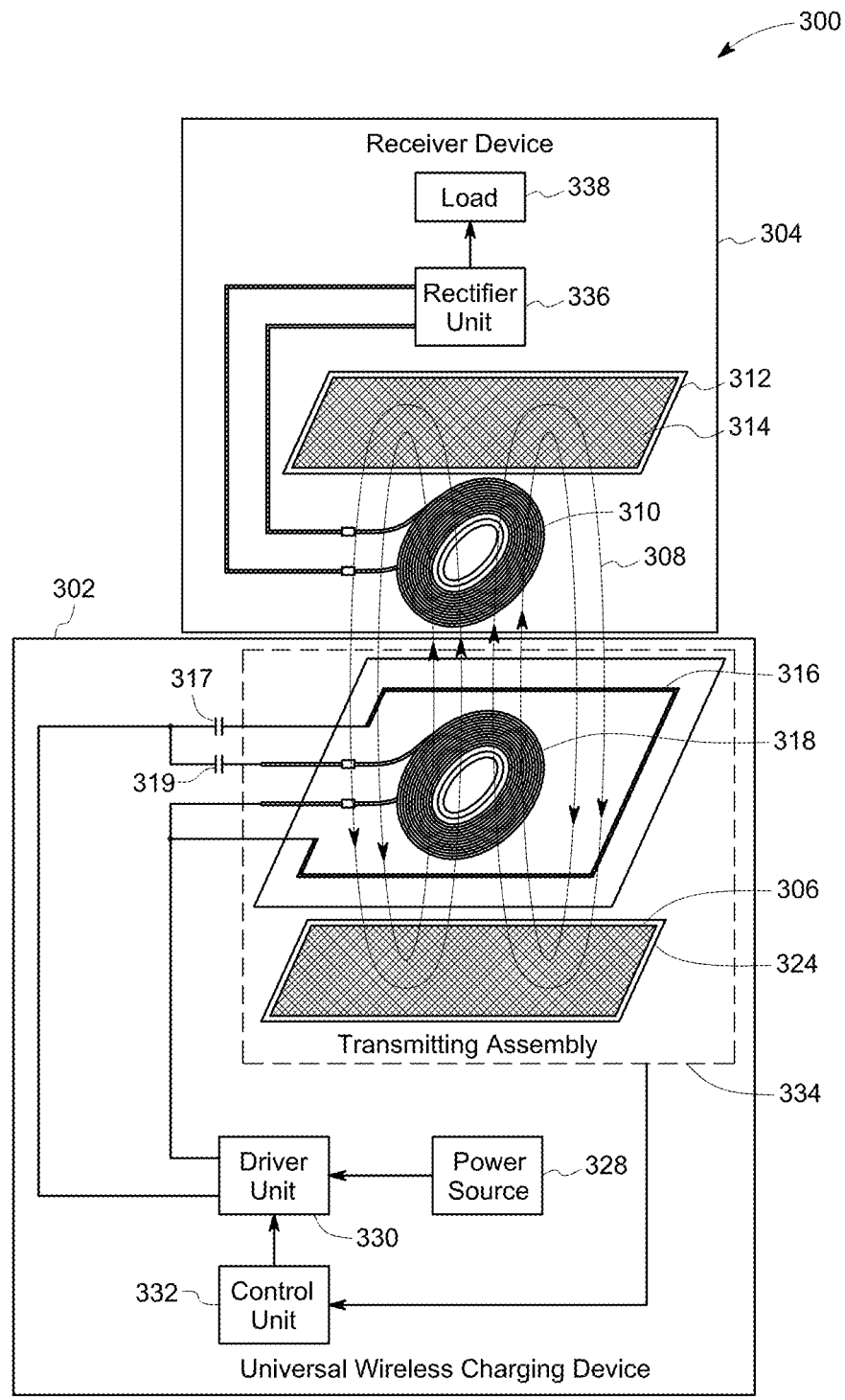
FIG. 3 is a diagrammatical representation of one embodiment of the wireless power transfer system of FIG. 1 that includes the universal charging device of FIG. 2, in accordance with aspects of the present specification.

Turning now to FIG. 3, a diagrammatical representation 300 of one embodiment of the wireless power transfer system 100 of FIG. 1, in accordance with aspects of the present specification, is depicted. The wireless power transfer system 300 includes a universal wireless charging device 302 and a receiver device 304. The receiver device 304 may be one of the receiver devices 104, 106 of FIG. 1. Further, the universal wireless charging device 302 is similar to the universal wireless charging device 200 of FIG. 2. More particularly, the universal wireless charging device 302 includes a power source 328, a driver unit 330, a control unit 332, and a transmitting assembly 334. The transmitting assembly 334 includes a first coil 316, a first capacitor 317, a second coil 318, and a second capacitor 319. Additionally, the universal charging device 302 of FIG. 3 includes a shielding unit 324 having a ferrite layer 306.

Also, the receiver device 304 includes a rectifier unit 336 and a load 338. Additionally, the receiver device 304 includes a receiver coil 310 and a shielding unit 312 having a ferrite layer 314. As depicted in FIG. 3, the shielding unit 324 is operatively coupled to at least one of the first coil 316 and the second coil 318 and configured to shield one or more components in the wireless power transfer system 300 from an AC magnetic field 308 generated by at least one of the first coil 316 and the second coil 318 in the transmitting assembly 334. Also, the shielding unit 324 increases the coupling between the transmitting assembly 334 and the receiving device 304 by enhancing magnetic coupling of the first and second coils 216, 218 in the transmitting assembly 334 with the receiver coil 310 in the receiver device 304. As will be appreciated, the AC magnetic field 308 may be generated when a first AC voltage signal and/or a second AC voltage signal respectively flow through the first coil 316 and the second coil 318. In one embodiment, the shielding unit 324 may be positioned beneath the first coil 316 and the second coil 318. In another embodiment, the shielding unit 324 may be positioned only beneath the first coil 316.

It may be noted that the AC magnetic field 308 generated by the coils 316, 318 may induce eddy current loops in conductive components such as the power source 328, the driver unit 330, and the like. The eddy current loops result in generation of heat in these conductive components. Also, the magnetic or inductive coupling between the coils 316, 318 in the transmitting assembly 334 and the receiver coil 310 in the receiver device 304 may result in the eddy current loops in these conductive components in the universal wireless charging device 302, thereby resulting in power loss and electromagnetic interference (EMI) issues in the universal wireless charging device 302. The shielding unit 324 is used to prevent any negative impact on these conductive components in the universal wireless charging device 302 due to the AC magnetic field 308, thereby preventing these conductive components from damage.

Further, in a presently contemplated configuration, the shielding unit 324 includes the ferrite layer 306 that is configured to reduce reluctance of the AC magnetic field 308 associated with at least one of the first AC voltage signal and the second AC voltage signal. This reduction in the reluctance of the AC magnetic field 308 in turn aids in enhancing the magnetic coupling of at least one of the first coil 216 and the second coil 218 with the receiver coil 310 in the receiver device 304. In particular, the ferrite layer 306 provides greater permeability to the AC magnetic field 308 in comparison to the air around the coils 316, 318. Hence, the ferrite layer 306 is employed to influence the AC magnetic field 308 to improve transmission efficiency and magnetic coupling of the coils 316, 318 with the receiver device 304. Moreover, by positioning the ferrite layer 306 beneath the coils 316, 318, the AC magnetic field 308 is restricted from impacting the conductive components in the universal wireless charging device 302. As a result, eddy current losses and proximity losses of the first AC voltage signal and the second AC voltage signal may be significantly reduced.

In one embodiment, another shielding unit 312 may also be positioned in the receiver device 304 to shield one or more conductive components in the receiver device 304 from the AC magnetic field 308 at the receiver device 304. In the embodiment of FIG. 3, the shielding unit 312 having a ferrite layer 314 is positioned above the receiver coil 310 to prevent the AC magnetic field from affecting the conductive components, such as the rectifier unit 336 and the load 338 in the receiver device 304.

Figure 4:
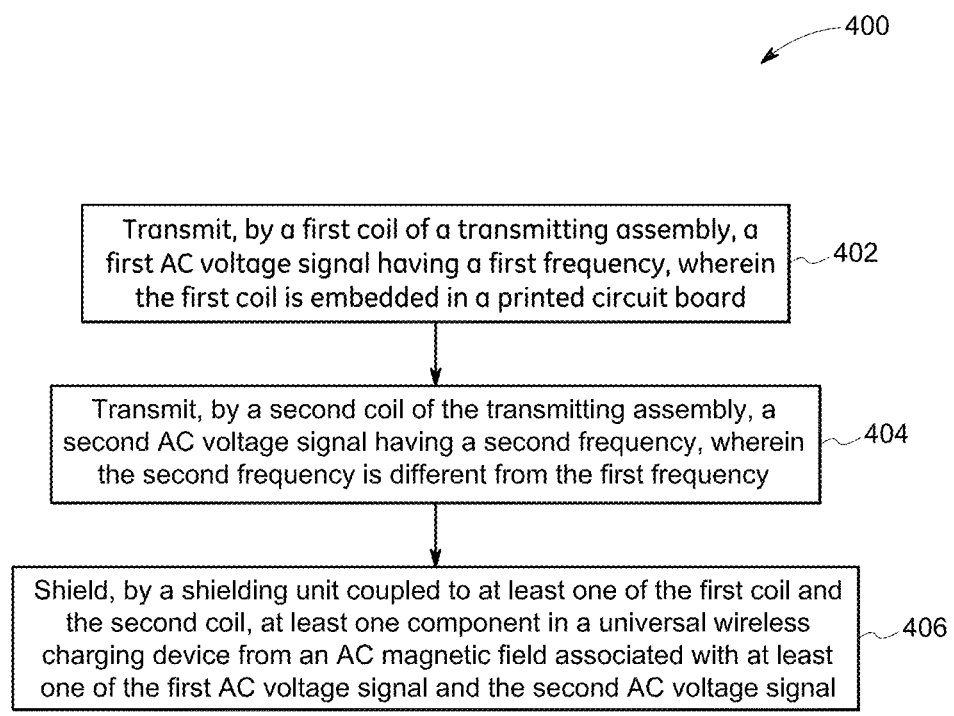
FIG. 4 is a flow chart illustrating a method for transmitting electric power employing a transmitting assembly of the universal wireless charging device of FIG. 2, in accordance with aspects of the present specification.

Referring to FIG. 4, a flow chart illustrating a method 400 for transmitting electric power employing a transmitting assembly of a universal wireless charging device, in accordance with aspects of the present specification, is depicted. For ease of understanding, the method 400 is described with reference to the components of FIGS. 1-3. As previously noted, the universal wireless charging device 200 includes the power source 208, the driver unit 210, the control unit 212, and the transmitting assembly 214.

The method 400 begins with a step 402, where a first AC voltage signal having a first frequency is transmitted. In particular, the first coil 216 of the transmitting assembly 214 is used to transmit the first AC voltage signal having the first frequency to the first receiver device 104. As previously noted, the first coil 216 is embedded in the printed circuit board (PCB) 220. Further, when the driver unit 210 generates the first AC voltage signal having the first frequency, the first coil 216 embedded in the PCB 220 and the first capacitor 217 resonate at the first frequency to transmit the first AC voltage signal to the first receiver device 104.

Further, at step 404, a second AC voltage signal having a second frequency is transmitted. In particular, the second coil 218 of the transmitting assembly 214 is used to transmit the second AC voltage signal having the second frequency to the second receiver device 106. More specifically, the second coil 218 may be a Litz wire coil that is positioned within an aperture of the PCB 220. Further, when the driver unit 210 generates the second AC voltage signal having the second frequency, the second coil 218 and the second capacitor 219 resonate at the second frequency to transmit the second AC voltage signal to the second receiver device 106.

In addition, at step 406, at least one component in the universal wireless charging device 200 is shielded from an AC magnetic field associated with at least one of the first AC voltage signal and the second AC voltage signal. More particularly, the universal wireless charging device 302 includes the shielding unit 324 that is coupled to at least one of the first coil 316 and the second coil 318 and configured to shield one or more components in the universal wireless charging device 302 from the AC magnetic field 308 associated with at least one of the first AC voltage signal and the second AC voltage signal. In certain embodiments, the shielding unit 324 includes the ferrite layer 306 that provides a greater permeability to the AC magnetic field 308 than the air around the coils 316, 318. Hence, the ferrite layer 306 may reduce the reluctance of the AC magnetic field 308 to enhance the magnetic coupling of the coils 316, 318 and the receiver device 304. In one example, the ferrite layer 306 may influence the AC magnetic field 308 to be focused along a desired direction to improve the transmission efficiency and enhance the magnetic coupling of the coils 316, 318 and the receiver device 304. Also, focusing the AC magnetic field 308 along the desired direction, shields the components in the universal wireless charging device 302 from the AC magnetic field 308. As a result, these components may be protected from self-heating and EMI issues in the wireless charging device 200, 302, thereby preventing the components from damage.

Figure 5:
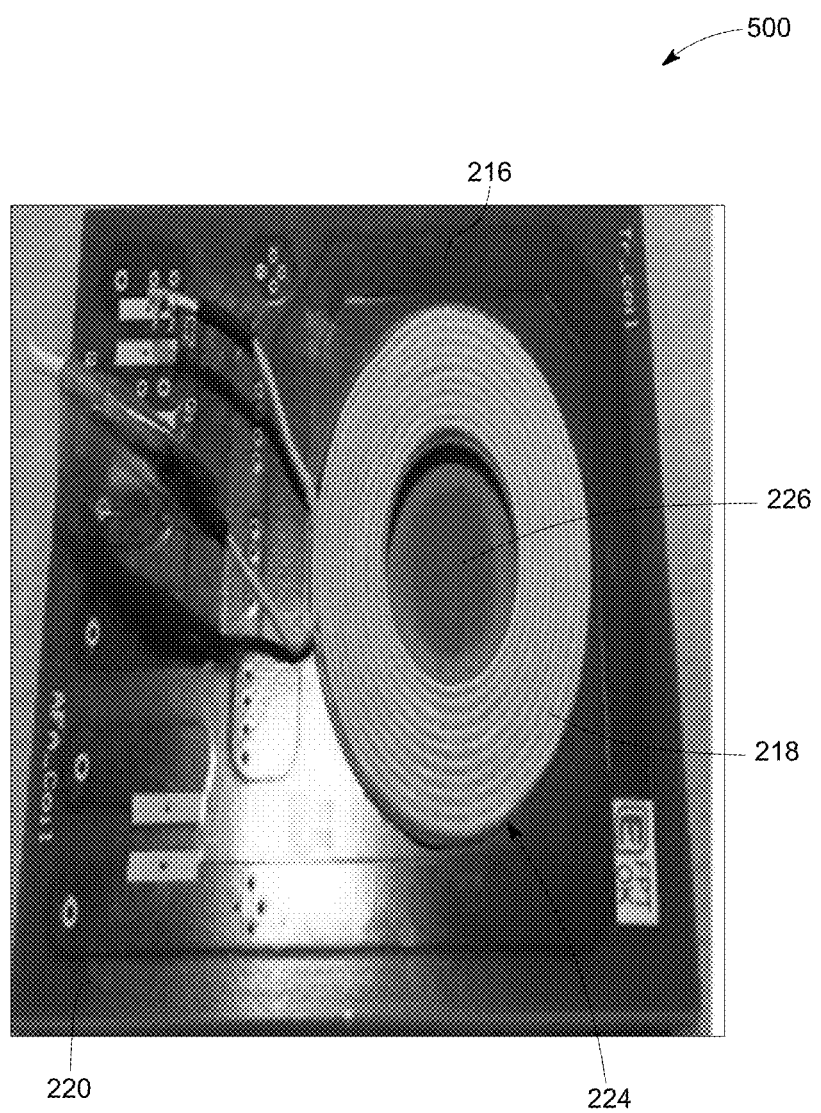
FIG. 5 is an image of one embodiment of a transmitting assembly employed in the universal charging device of FIG. 2, in accordance with aspects of the present specification.

FIG. 5 is an image 500 of one embodiment of a transmitting assembly employed in a universal charging device of FIG. 2, in accordance with aspects of the present specification. The image 500 depicts the first coil 216 that is embedded in the PCB 220 and the second coil 218 that is disposed within an aperture 224 of the PCB 220. Also, the shielding unit 226 is positioned beneath the first coil 216 and the second coil 218.

The various embodiments of the exemplary system and method described hereinabove aid in transmitting voltage signals having different frequencies, thereby enabling charging of the one or more wireless receiver devices operating at different frequency standards. As a result, set-up costs and maintenance costs of the exemplary power transfer system are substantially reduced. In addition, the exemplary system and method described hereinabove aid in shielding or insulating one or more components in the universal wireless charging device from the AC magnetic field generated in the system. Consequently, self-heating, EMI, and/or other stresses on the components in the wireless power transfer system are reduced, thereby preventing the components from damage.

While only certain features of the present disclosure have been illustrated and described herein, many modifications and changes will occur to those skilled in the art. It is, therefore, to be understood that the appended claims are intended to cover all such modifications and changes as fall within the true spirit of the present specification.

We claim:

1. An assembly for a wireless charging device, the assembly comprising:
a first coil formed by one or more electrical conducting tracks that are printed or embedded in at least one layer of a printed circuit board (PCB), the first coil configured to transmit a first alternating current (AC) voltage signal having a first frequency according to a first wireless charging standard; and
a second coil formed by a wire coil that is disposed on a surface of the PCB or within an aperture of the PCB, the second coil configured to transmit a second AC voltage signal having a second frequency according to a second wireless charging standard, wherein the second frequency is different from the first frequency.

2. The assembly of claim 1, further comprising a shielding unit that includes a ferrite layer positioned between at least one of the first coil or the second coil and at least one other component in the wireless charging device.

3. The assembly of claim 2, wherein the ferrite layer is configured to:
shield the at least one other component in the wireless charging device from a magnetic field associated with at least one of the first AC voltage signal or the second AC voltage signal,
reduce reluctance of the magnetic field,
enhance a magnetic coupling of at least one of the first coil or the second coil with a receiver device, or
reduce eddy current losses and proximity losses of at least one of the first AC voltage signal or the second AC voltage signal.

4. The assembly of claim 1, wherein the first coil is formed by a plurality of electrical conducting tracks printed or embedded in a plurality of layers of the PCB, the plurality of electrical conducting tracks helically arranged in the plurality of layers of the PCB and coupled to each other to form the first coil.

5. The assembly of claim 1, wherein the first coil has a determined trace width of at least 1 mm and a determined trace thickness of at least 35 microns.

6. The assembly of claim 1, wherein the wire coil of the second coil is a Lutz wire coil wound in a determined shape and positioned within the aperture of the PCB.

7. The assembly of claim 1, wherein the second coil has a thickness in a range from about 0.2 mm to about 5 mm.

8. The assembly of claim 1, wherein the first coil and the second coil are coplanar and concentric to each other.

9. The assembly of claim 1, wherein the first coil is printed or embedded along a periphery of the PCB and the second coil is positioned such that the first coil surrounds the second coil.

10. A method of an assembly for a wireless charging device, the method comprising:
transmitting, by a first coil of the assembly, a first alternating current (AC) voltage signal having a first frequency according to a first wireless charging standard, wherein the first coil is formed by one or more electrical conducting tracks that are printed or embedded in at least one layer of a printed circuit board (PCB); and
transmitting, by a second coil of the assembly, a second AC voltage signal having a second frequency according to a second wireless charging standard, wherein the second coil is formed by a wire coil that is disposed on a surface of the PCB or within an aperture of the PCB, and wherein the second frequency is different from the first frequency.

11. The method of claim 10, further comprising:
shielding, by a shielding unit, at least one other component in the wireless charging device from a magnetic field associated with at least one of the first AC voltage signal or the second AC voltage signal, wherein the shielding unit includes a ferrite layer positioned between at least one of the first coil or the second coil and the at least one other component in the wireless charging device.

12. The method of claim 11, wherein the ferrite layer is further configured to:
reduce reluctance of the magnetic field,
enhance a magnetic coupling of at least one of the first coil or the second coil with a receiver device, or
reduce eddy current losses and proximity losses of at least one of the first AC voltage signal or the second AC voltage signal.

13. A wireless charging device, comprising:
a power source configured to generate a direct current (DC) voltage signal;
a driver unit coupled to the power source and configured to convert the DC voltage signal to one of a first AC voltage signal having a first frequency and a second AC voltage signal having a second frequency, wherein the second frequency is different from the first frequency; and
an assembly coupled to the driver unit, wherein the assembly includes:
a first coil formed by one or more electrical conducting tracks that are printed or embedded in at least one layer of a printed circuit board (PCB), the first coil configured to transmit the first AC voltage signal having the first frequency according to a first wireless charging standard; and
a second coil formed by a wire coil that is disposed on a surface of the PCB or within an aperture of the PCB, the second coil configured to transmit the second AC voltage signal having the second frequency according to a second wireless charging standard.

14. The wireless charging device of claim 13, further comprising a control unit coupled to the driver unit and the assembly, wherein the control unit is configured to:
detect a receiver device;
generate a first control signal or a second control signal based on which whether the receiver device is associated with the first wireless charging standard or the second wireless charging standard; and
communicate the first control signal or the second control signal to the driver unit.

15. The wireless charging device of claim 14, wherein the driver unit is configured to convert the DC voltage signal to the first AC voltage signal based on receipt of the first control signal from the control unit.

16. The wireless charging device of claim 14, wherein the driver unit is configured to convert the DC voltage signal to the second AC voltage signal based on receipt of the second control signal from the control unit.

17. The wireless charging device of claim 13, wherein the first coil and the second coil are coplanar and concentric to each other.

18. The method of claim 10, wherein the first AC voltage signal and the second AC voltage signal are used to wirelessly charge a plurality of receiver devices having different wireless charging standards.

19. The wireless charging device of claim 13, wherein the first AC voltage signal and the second AC voltage signal are used to wirelessly charge a plurality of receiver devices having different wireless charging standards.

* * * * *